US008858820B2

(12) United States Patent
Griffith

(10) Patent No.: US 8,858,820 B2
(45) Date of Patent: Oct. 14, 2014

(54) BROMOFLUOROCARBON COMPOSITIONS

(71) Applicant: American Pacific Corporation, Las Vegas, NV (US)

(72) Inventor: Kris N. Griffith, Las Vegas, NV (US)

(73) Assignee: American Pacific Corporation, Las Vegas, NV (US)

( * ) Notice: Subject to any disclaimer, the term of this patent is extended or adjusted under 35 U.S.C. 154(b) by 0 days.

(21) Appl. No.: 13/646,535

(22) Filed: Oct. 5, 2012

(65) Prior Publication Data

US 2013/0146316 A1 Jun. 13, 2013

Related U.S. Application Data

(60) Provisional application No. 61/632,406, filed on Oct. 7, 2011.

(51) Int. Cl.
*A62D 1/00* (2006.01)
*A62D 1/08* (2006.01)
*C09K 5/04* (2006.01)
*A62C 13/00* (2006.01)

(52) U.S. Cl.
CPC ............... *A62D 1/0092* (2013.01); *C09K 5/04* (2013.01); *A62D 1/0057* (2013.01); *A62C 13/003* (2013.01)
USPC .................................................. 252/8; 252/2

(58) Field of Classification Search
USPC ......................................................... 252/2, 8
See application file for complete search history.

(56) References Cited

U.S. PATENT DOCUMENTS

| 2,904,600 | A | 9/1959 | Copelin |
| 3,120,567 | A | 2/1964 | Dial |
| 3,974,230 | A | 8/1976 | Archer et al. |
| 4,018,837 | A | 4/1977 | Archer et al. |
| 4,152,359 | A | 5/1979 | Dempf et al. |
| 4,217,310 | A | 8/1980 | Cormany |
| 4,469,906 | A | 9/1984 | Blum |
| 4,659,505 | A | 4/1987 | Enjo et al. |
| 4,973,421 | A | 11/1990 | Tamura et al. |
| 5,035,828 | A | 7/1991 | Tamura et al. |
| 5,120,470 | A | 6/1992 | Ohmure et al. |
| 5,127,934 | A | 7/1992 | Mattox |
| 5,202,044 | A | 4/1993 | Hagihara et al. |
| 5,364,950 | A | 11/1994 | Babin et al. |
| 5,447,647 | A | 9/1995 | Ishida et al. |
| 5,665,170 | A | 9/1997 | Lee et al. |
| 5,665,172 | A | 9/1997 | Oshima et al. |
| 5,665,173 | A | 9/1997 | Lee |
| 5,669,985 | A | 9/1997 | Lee et al. |
| 5,679,632 | A | 10/1997 | Lee et al. |
| 5,690,862 | A | 11/1997 | Moore, Jr. et al. |
| 5,707,954 | A | 1/1998 | Lee |
| 5,759,430 | A | 6/1998 | Tapscott et al. |
| 5,792,277 | A | 8/1998 | Shubkin et al. |
| 5,858,953 | A | 1/1999 | Aman et al. |
| 5,900,185 | A | 5/1999 | Tapscott |
| 6,010,997 | A | 1/2000 | Thenappan et al. |
| 6,048,832 | A | 4/2000 | Thenappan et al. |
| 6,048,833 | A | 4/2000 | DeGroot |
| 6,103,684 | A | 8/2000 | Thenappan et al. |
| 6,114,293 | A | 9/2000 | Beaver et al. |
| 6,133,221 | A | 10/2000 | Beaver et al. |
| 6,153,118 | A | 11/2000 | Hasegawa et al. |
| 6,231,782 | B1 | 5/2001 | Shimomura et al. |
| 6,300,378 | B1 | 10/2001 | Tapscott |
| 6,350,395 | B1 | 2/2002 | Kuemin |
| 6,365,565 | B1 | 4/2002 | Thenappan et al. |
| 6,831,045 | B2 | 12/2004 | Shimomura et al. |
| 6,998,065 | B1 | 2/2006 | Hasegawa et al. |
| 7,018,961 | B2 | 3/2006 | Tazaki |
| 7,153,446 | B2 | 12/2006 | Grigg |
| 7,223,351 | B2 | 5/2007 | Sharma et al. |
| 2006/0108559 | A1 | 5/2006 | Sharma et al. |
| 2006/0201687 | A1 | 9/2006 | Fortenberry |
| 2006/0266976 | A1 | 11/2006 | Minor et al. |
| 2007/0108403 | A1* | 5/2007 | Sievert et al. .................... 252/67 |
| 2008/0058231 | A1 | 3/2008 | Yamaguchi et al. |
| 2010/0004155 | A1* | 1/2010 | Ishihara et al. ............... 510/506 |
| 2010/0133463 | A1 | 6/2010 | Kaneko et al. |

FOREIGN PATENT DOCUMENTS

| CA | 1124733 | 6/1982 |
| CN | 1730127 | 2/2006 |
| CN | 1740125 | 3/2006 |
| CN | 101186556 | 5/2008 |
| GB | 2027697 | 2/1980 |
| JP | 02303522 | 12/1990 |
| JP | 2005075977 | 3/2005 |
| WO | WO 98/13437 | 4/1998 |
| WO | WO 2007/144623 | 12/2007 |
| WO | WO 2009/018299 | 2/2009 |

OTHER PUBLICATIONS

International Search Report and Written Opinion issued in application No. PCT/US12/59031 on Dec. 10, 2012.
Tapscott et al., "Tropodegradable Fluorocarbon Replacements for Ozone-depleting and Global-warming Chemicals", Journal of Fluorine Chemistry, 101:209-213, 2000.
Written Opinion issued in application No. PCT/US12/59031 on Oct. 17, 2013.

(Continued)

*Primary Examiner* — Peter F Godenschwager
(74) *Attorney, Agent, or Firm* — Knobbe Martens Olson & Bear LLP

(57) ABSTRACT

Compositions are described that may be used for applications such as a fire extinguishing composition in fire extinguishing unit, refrigeration, and the like. These compositions include halocarbons and additives that may stabilize the composition in the presence of a metal, water, and/or air. For example, the compositions may include a bromofluorocarbon, such as a bromofluoroalkene, an acid scavenger stabilizer, and an antioxidant stabilizer.

15 Claims, 1 Drawing Sheet

(56) References Cited

OTHER PUBLICATIONS

Examination Report issued in Pakistan application No. 676/2012 on Jul. 15, 2013.

International Preliminary Report on Patentability issued in International Application No. PCT/US12/59031 on Mar. 12, 2014.

* cited by examiner

BROMOFLUOROCARBON COMPOSITIONS

CROSS-REFERENCE TO RELATED APPLICATIONS

This application claims priority under 35 U.S.C. §119(e) to U.S. Provisional Application No. 61/632,406, filed Oct. 7, 2011.

BACKGROUND

1. Field

The embodiments relate to compositions, such as halocarbon compositions, for uses such as fire extinguishing or refrigeration.

2. Description of the Related Art

Halocarbons may be useful components of fire extinguishing compositions. Typical halocarbons commercialized as fire extinguishing agents include halons, hydrochlorofluorocarbons, hydrofluorocarbons and perfluoroketones. Due to global warming and ozone depletion concerns, a new class of halocarbons have been determined to be effective fire extinguishing agents and provide a smaller environmental footprint than currently used agents. This new class consists of halogentated alkenes containing bromine and fluorine, and optionally hydrogen.

SUMMARY

Compositions described herein may be used for applications such as a fire extinguishing composition in fire extinguishing unit, refrigeration, and the like. These compositions comprise halocarbons and additives that may stabilize the composition in the presence of a metal, water, and/or air. For example, the compositions may comprise a bromofluorocarbon, such as a bromofluoroalkene, an acid scavenger stabilizer, and an antioxidant stabilizer.

Some embodiments include a composition, such as a stabilized fire extinguishing composition, with stabilizers comprising: cyclohexene oxide or cyclopentene oxide; and 2,5-di-tert-butyl-4-methoxyphenol; a $C_{7-9}$ branched alkyl ester of 3,5,-di-tert-butyl-4-hydroxycinnamic acid; di-n-butylsulfoxide; or 1,2,5,6-diepoxycyclooctane.

Some embodiments include a composition, such as a fire extinguishing composition, comprising: 2-bromo-3,3,3-trifluoropropene; an acid scavenger stabilizer comprising an epoxide; and an antioxidant stabilizer. In some embodiments, a fire extinguishing composition may be under pressure. For example, the fire extinguishing composition may have a pressure of about 70 psig to about 800 psig.

Some embodiments include a method of stabilizing 2-bromo-3,3,3-trifluoropropene comprising adding to the 2-bromo-3,3,3-trifluoropropene an effective amount of: cyclohexene oxide or cyclopentene oxide; and 2,5-di-tert-butyl-4-methoxyphenol; a $C_{7-9}$ branched alkyl ester of 3,5,-di-tert-butyl-4-hydroxycinnamic acid; di-n-butylsulfoxide; or 1,2,5,6-diepoxycyclooctane.

Some embodiments include a fire extinguishing unit, comprising a container, a valve, optionally a hose, and a nozzle; wherein said container contains a fire extinguishing composition which comprises: 2-bromo-3,3,3-trifluoropropene; cyclohexene oxide or cyclopentene oxide; and 2,5-di-tert-butyl-4-methoxyphenol; a $C_{7-9}$ branched alkyl ester of 3,5,-di-tert-butyl-4-hydroxycinnamic acid; di-n-butylsulfoxide; or 1,2,5,6-diepoxycyclooctane.

Some embodiments include a fire extinguishing system comprising a composition described herein.

Some embodiments include a fire extinguishing unit, comprising a container, a valve, optionally a hose, and a nozzle; wherein said container contains a fire extinguishing composition which comprises: 2-bromo-3,3,3-trifluoropropenean acid scavenger stabilizer comprising an epoxide; and an antioxidant stabilizer; wherein the fire extinguishing composition is pressurized with an inert gas to about 70 psig to about 800 psig.

DETAILED DESCRIPTION

Figure 1:
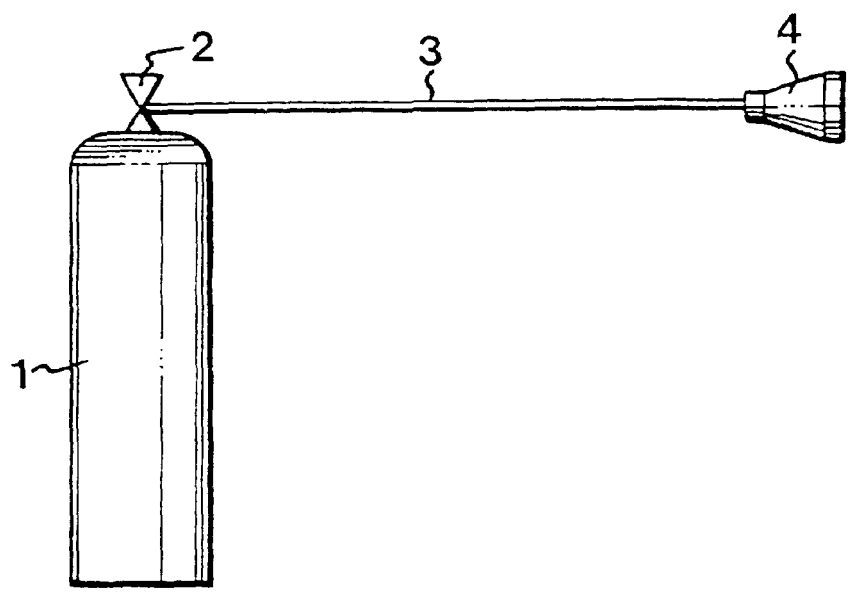
FIG. 1 depicts an embodiment of a hand-held fire extinguishing unit.

Some stabilized halocarbon compositions may comprise a halocarbon, an acid scavenger stabilizer, and an antioxidant stabilizer.

A halocarbon may include any bromofluorocarbon or bromofluoroalkene, such as any compound comprising bromine, fluorine, carbon, and optionally hydrogen, including bromofluoroalkenes such as $C_{2-6}$ bromofluoroalkenes, including bromofluoropropenes and bromofluorobutenes. Examples may include, but are not limited to, 3-bromo-3,3-difluoro-1-propene ($CH_2$=$CHCF_2Br$, CAS No. 420-90-6), 2-bromo-3,3,3-trifluoro-1-propene ($CH_2$=$CBr$—$CF_3$, CAS No. 1514-82-5), 1-bromo-3,3,3-trifluoro-1-propene (BrCH=CH—$CF_3$), 3-bromo-1,1,3,3-tetrafluoro-1-propene ($CF_2$=CH—$CF_2Br$, CAS No. 460-61-7), 2,3-dibromo-3,3-difluoro-1-propene ($CH_2$=$CBr$—$CBrF_2$), 1,2-dibromo-3,3,3-trifluoro-1-propene (BrCH=$CBr$—$CF_3$), 4-bromo-3,3,4,4-tetrafluoro-1-butene ($CH_2$=CH—$CF_2CF_2Br$, CAS No. 18599-22-9), 4-bromo-3,4,4-trifluoro-3-(trifluoromethyl)-1-butene ($CH_2$=CH—$CF(CF_3)$—$CBrF_2$, CAS No. 2546-54-5), and the like.

In some embodiments, a halocarbon comprises 2-bromo-3,3,3-trifluoropropene. This compound is also known by other names, such as 1-propene, 2-bromo-3,3,3-trifluoro-; propene, 2-bromo-3,3,3-trifluoro-(6ci, 8ci); 2-bromo-3,3,3-trifluoro-1-propene; 3,3,3-trifluoro-2-bromopropene. Other names may also be known. 2-bromo-3,3,3-trifluoropropene has been shown to be stable in nuclear magnetic resonance (NMR) spectroscopy analysis. However, after degraded material stored in metal containers was discovered, it was determined that the material reacts slowly with moisture and air that is present in storage containers and long-term stability was an issue, especially for use in fire extinguishing systems which typically are considered to have a 12 year lifespan. Reactions with air tend to result in acidity which may become significant enough to cause corrosion of metals. As metal ions are created, they are believed to act as catalysts for polymerization of the material. Moisture present in the material or storage container will aid in polymer formation. Therefore, this material cannot be considered useful, particularly for long term storage, without stabilizer additives.

An acid scavenger stabilizer may comprise any compound which is useful to react with acids including halogenated acids that may be present in the halocarbon. Some acid scavenger stabilizers may comprise an epoxy compound such as ethene oxide, propylene oxide (CAS Reg. No. 75-56-9), butene oxide, cyclopropene oxide, cyclobutene oxide, pentene oxide, cyclopentene oxide (CAS Reg. No. 285-67-6), hexene oxide, cyclohexene oxide, heptylene oxide, cycloheptene oxide, and the like.

In some embodiments, the acid scavenger stabilizer may comprise cyclohexene oxide, which has a CAS Registry Number of 286-20-4 and is represented by the structural formula:

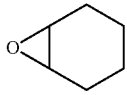

This compound is also known by the names 7-oxabicyclo[4.1.0]heptane (CA index name); 1,2-cyclohexene oxide; 1,2-epoxycyclohexane; 2,3-tetramethyleneoxirane; cis-1,2-epoxycyclohexane; cis-7-oxabicyclo[4.1.0]heptane; cis-cyclohexene oxide; cyclohexane, 1,2-epoxy-; cyclohexene epoxide; cyclohexene, oxide; cyclohexylene oxide; NSC 128074; NSC 5218; and tetramethyleneoxirane. Other names may also be known.

An acid scavenger may have any concentration that is effective to remove acids formed under the air and water contamination levels when using industry standard material handling practices for servicing fire extinguishers. For example, the concentration of acid scavenger, including any acid scavenger recited above, may be: about 500 ppm, about 750 ppm, about 1000 ppm, about 1500 ppm, about 2000 ppm, about 2500 ppm, about 5000 ppm, about 7500 ppm, about 10,000 ppm, or any concentration in a range bounded by, or between, these values, based upon the weight of the fire extinguishing composition. In some embodiments, cyclohexene oxide and/or cyclopentene oxide is present at a concentration of about 2000 ppm by weight.

An antioxidant stabilizer may comprise any antioxidant compound, such as a hindered phenol, including 2,5-di-tert-butyl-4-methoxyphenol, alkyl esters of 3,5,-di-tert-butyl-4-hydroxycinnamic acid, including $C_{7-9}$ branched alkyl esters, and the like; a sulfoxide such as dimethylsulfoxide, diethylsulfoxide, dipropylsulfoxide, di-n-butylsulfoxide, etc; a polyepoxy compound such as 1,2,5,6-diepoxycyclooctane; etc.

In some embodiments, the antioxidant stabilizer may comprise 2,5-di-tert-butyl-4-methoxyphenol, which has a CAS Registry Number of 1991-52-2 and is represented by the structural formula:

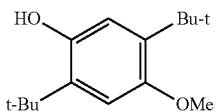

This compound is also known by the names phenol, 2,5-bis(1,1-dimethylethyl)-4-methoxy-(CA Index name); phenol, 2,5-di-tert-butyl-4-methoxy-(6CI, 7CI, 8CI); 2,5-di-tert-butyl-4-hydroxyanisole; 2,5-di-tert-butyl-4-methoxyphenol. Other names may also be known.

In some embodiments, the antioxidant stabilizer may comprise 3,5,-di-tert-butyl-4-hydroxycinnamic acid, $C_{7-9}$ branched alkyl ester, which has a CAS Registry Number of 125643-61-0. This substance is also known as benzenepropanoic acid, 3,5-bis(1,1-dimethylethyl)-4-hydroxy-, $C_{7-9}$-branched alkyl esters (CA Index name). Other names may also be known.

In some embodiments, the antioxidant stabilizer may comprise di-n-butylsulfoxide, which has a CAS Registry Number of 2168-93-6 and is represented by the structural formula:

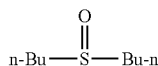

This compound is also known by the names butane, 1-(butylsulfinyl)-(CA Index name); butane, 1,1'-sulfinylbis-(9CI); butyl sulfoxide (6CI, 8CI); 1,1'-sulfinylbis[butane]; dibutyl sulfoxide; n-butyl sulfoxide. Other names may also be known.

An antioxidant stabilizer may have any concentration that is effective to stabilize a composition, such as a composition comprising a halocarbon and/or acid scavenger, against oxidation. For example, the concentration of an antioxidant stabilizer, including any antioxidant stabilizer recited above may be: about 100 ppm, about 200 ppm, about 500 ppm, about 750 ppm, about 1000 ppm, about 1500 ppm, about 2000 ppm, about 3000 ppm, about 5000 ppm, or any concentration in a range bounded by, or between, these values, based upon the weight of the composition. In some embodiments, 2,5-di-tert-butyl-4-methoxyphenol is present at a concentration of about 1000 ppm by weight. In some embodiments, the concentration of all 3,5-di-tert-butyl-4-hydroxycinnamic acid, C7-9 branched alkyl esters present in the composition is about 1000 ppm by weight. In some embodiments, di-n-butylsulfoxide is present at a concentration of about 100 ppm by weight.

The compositions may further comprise an inert gas. The character of the inert gas may vary, and may include, for example, any composition, compound, or element which is in gaseous state under conditions in which a fire extinguisher may be stored, and which does not react when exposed to fire in such a manner that the fire is promoted. An inert gas may be capable of functioning as a propellant for the fire extinguishing composition so that it propels the fire extinguishing composition out of a fire extinguishing unit when the fire extinguishing unit is opened. An inert gas may have solubility in the composition that may be low enough to allow the inert gas to achieve an acceptable pressure to act as a propellant. For example, the pressure of the composition, or the partial pressure of an inert gas in the composition, may be: about 20 psig, about 29 psig, about 30 psig, about 70 psig, about 72 psig, about 87 psig, about 100 psig, about 101 psig, about 125 psig, about 150 psig, about 195 psig, about 200 psig, about 217 psig, about 220 psig, about 360 psig, about 450 psig, about 600 psig, about 725 psig, about 800 psig, or any pressure in a range bounded by, or between, any of these values. Some examples of inert gases may include, but are not limited to, $N_2$, He, Ar, Kr, Xe, and combinations thereof.

These compositions may be stable in the presence of a metal, such as a metal comprising at least one of: steel, stainless steel, carbon steel, brass, copper, and aluminum. For example, a composition may be stable in the presence of a metal comprising carbon steel or brass such that: 1) substantially no visible change to the metal occurs or 2) substantial no visible change to the composition occurs, upon contact between the composition and the metal for about 2 weeks at about 60° C. Some compositions may contain low levels of water and/or oxygen and still maintain stability. For example, some stable compositions may have a water level, by weight, of: about 0.1 ppm, about 1 ppm, about 10 ppm, about 50 ppm, about 100 ppm, about 500 ppm, about 1000 ppm, or any concentration bounded by, or between, any of these values.

These compositions may be stable in the presence of air. Thus, some compositions may be stored in contact with air within a storage container so that the composition may have contact with limited amounts of atmospheric oxygen.

Having compositions that are stable in the presence of metal, water, and/or air may be useful, for example, if a composition includes low levels of water or other impurities and/or is exposed to some level of air. Thus, in some embodiments, a composition is stored in a container comprising a metal surface, wherein at least a portion of the metal surface is in contact with at least a portion of the composition. In some embodiments, the metal may be carbon steel, brass, or a combination of carbon steel and brass. Stability may be observed, for example, by an absence of discoloration or any other visible changes in the composition and or metal, or by another indicator such as acidity measurement. For example, a clear composition may remain clear, a colorless composition may remain colorless, and/or a metal may have no visible change in appearance. Stability may also be described as only subtle changes occurring such that material contained in fire extinguishers may will remain useable and not result in long-term metal corrosion issues. For example, material may take on a light yellow tint or cause insignificant changes in weight or appearance to metals.

The compositions described herein may be used for a number of applications, including as a fire extinguishing composition or in refrigeration. A fire extinguishing system or unit may comprise a composition described herein. For example, a fire extinguishing system may further comprise a container containing the composition, a valve, optionally a hose, and a nozzle. In some embodiments, the container may have a surface comprising a metal such as steel or brass.

A fire extinguishing unit may comprise a container filled with a composition disclosed herein at a working pressure. The working pressure may vary according to the needs of the fire extinguishing unit or system. For example, if the composition is dropped on the fire as opposed to being sprayed, the pressure may be low. If the composition is sprayed, a higher pressure may be required. For some pressurized fire extinguishing units or systems, the pressure may be: about 20 psig, about 29 psig, about 30 psig, about 70 psig, about 72 psig, about 87 psig, about 100 psig, about 101 psig, about 125 psig, about 150 psig, about 195 psig, about 200 psig, about 217 psig, about 220 psig, about 360 psig, about 450 psig, about 600 psig, about 725 psig, about 800 psig, or any pressure in a range bounded by, or between, any of these values.

The fire extinguishing unit may comprise a pressure delivery system. One example of a fire extinguishing unit with a pressure delivery system is depicted in FIG. 1. FIG. 1 is a schematic view of a hand-held extinguisher comprising a container 1, a valve 2, (optionally) a hose 3 and a nozzle 4. In some embodiments, the fire extinguishing unit can be provided with different types of nozzles and the filling degree can be varied, i.e. the container can be filled with a smaller or larger weight of extinguishing agent. In some embodiments, a fire extinguishing unit may comprise a conical nozzle, i.e. having a nozzle member which diverges in the direction of discharging the fire extinguishing agent.

Figure 2:
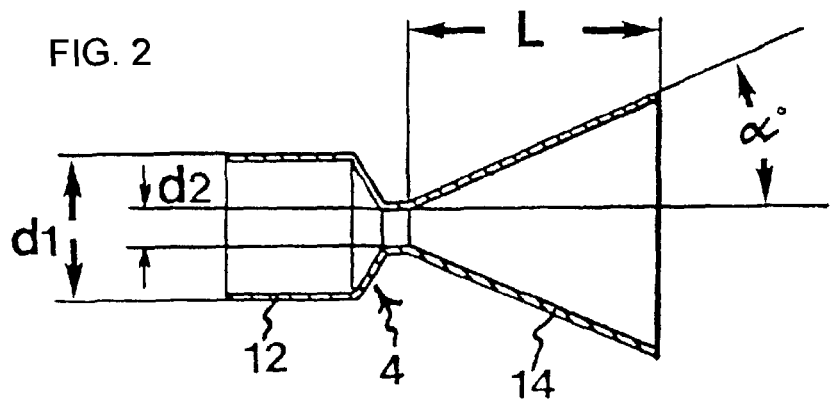
FIG. 2 depicts an embodiment of a nozzle.

FIG. 2 illustrates schematically an embodiment of a nozzle 4. This particular nozzle 4 comprises a connection 12 and a nozzle member 14. The nozzle or the connection has an inlet diameter $d_1$ and the nozzle member an inlet diameter $d_2$. The nozzle member has a length L and an outlet angle $\alpha$. In some embodiments, $d_1$, $d_2$, L and $\alpha$ have the following values.

$$d_2 < d_1 < 1.4 d_2$$

$$1.5 d_2 < L < 15 d_2$$

$$10 < \alpha < 40°$$

Some embodiments relate to a method for controlling the spreading of a fire or embers by applying a gas-liquid mixture as stated above.

In some embodiments, the particular use may affect the design of a nozzle. For example, a nozzle member may be designed to provide a droplet particle size and dispersion ratio of the fire extinguishing composition adapted to the use contemplated. For example, portable fire extinguishers may be adapted to apply a fire extinguishing composition to the fire center by spraying with a hose or some other feature. An improved effect may be achieved if the gas mixture is applied through a nozzle of the design illustrated in FIG. 2. For stationary systems, i.e. total flooding systems, the streaming of the fire extinguishing composition may not be as important. However, it may be important for the dispersion and evaporation of the gas mixture to be as rapid as possible.

The relationship between fire extinguishing composition and inert gas or propellant may be important in different fields of application. The extinguishing effect when the fire extinguishing composition is applied directly, as is the case when a portable fire extinguisher is used, may be dependent on the flow rate, e.g. amount of the fire extinguishing composition applied per unit of time, and the spray pattern. For example, if the spray pattern is too concentrated, it may penetrate the flames without any particular extinguishing effect. If the pattern is too finely divided, the fire extinguishing composition or basis may be moved away from the fire by hot fire gases thereby proving ineffective.

EXAMPLE 1

Approximately 1 kg of 2-bromo-3,3,3-trifluoropropene was stored over anhydrous sodium carbonate for several days. The 2-bromo-3,3,3-trifluoropropene was decanted under nitrogen into a distillation flask containing ~50 g of basic alumina, and the 2-bromo-3,3,3-trifluoropropene was distilled under nitrogen at atmospheric pressure. After storing for two weeks, the 2-bromo-3,3,3-trifluoropropene was used in the stability testing. A 3 mL aliquot was shaken with 5 mL of HPLC grade water. The pH of the aqueous phase was 5.26.

Cyclopentene Oxide [285-67-6] (CPO) was purchased from Lancaster and used as is. Cyclohexene Oxide 98% [286-20-4] (CHO) was purchased from Aldrich and used as is. Propylene Oxide 99+% [75-56-9] (PO) was purchased from Aldrich and used as is.

Metal coupons (½"×½") were brass (CDA280) or carbon steel (1010).

The test reactors were 20 mL scintillation vials with Teflon lined caps or array reactors having 81 wells that were heated and agitated.

Stock solutions of each epoxide were prepared by placing 842 mg of the epoxide into a volumetric flask and diluting to 10 mL with 2-bromo-3,3,3-trifluoropropene under nitrogen. Under nitrogen, 10 mL (16.5 g) of 2-bromo-3,3,3-trifluoropropene was placed into a 20 mL tared vial (glass weight only). A weighed metal coupon was added followed by 0.200 mL of selected epoxide stock solution under nitrogen. [Note: the final solution contained approximately 1000 ppm of epoxide]. Where appropriate, water was added via a microsyringe. The vials were placed in heated reactor block at 60° C. and stored under nitrogen for one week.

Color changes and visible metal corrosion were noted. An aliquot (3 mL) of the composition was removed, diluted with 5 mL of HPLC grade water, mixed; and measured pH of upper aqueous phase with the difference between starting and ending pH reflecting the amount of acidity formed. The coupons were removed, rinsed with acetone, dried, and weighed. The opened vials were then returned to the heated array block, and allowed to sit overnight at 33° C. while the 2-bromo-3,3,3-trifluoropropene evaporated. The block temperature was raised to 105° C., and held for one additional hour. Once cooled, the vials were weighed. The original tare weight was subtracted to obtain the residue weight.

Certain samples were spiked with 100 ppm and 1000 ppm water to determine the impact of small to significant water contamination levels to determine how protective the stabilizer additives were to moisture contamination.

The results are presented in Table 1 below. This study indicated that while epoxides are quite useful in the protecting against acid formation when material was stored under nitrogen. Later studies would indicate that epoxides alone were not as protective when air contamination is present.

3 mL aliquot is shaken with 5 mL of deionized water and the pH of the aqueous phase is measured.

Stabilizers Consisted of:

Cyclohexene Oxide 98% [286-20-4] (CHO) 2,5-Di-tert-butyl-4-methoxyphenol 97% [1991-52-2] (DTBMP). 3,5-Di-tert-butyl-4-hydroxyhydrocinnamic acid, C7-9 branched alkyl esters (Ethanox 4716)

Metal coupons (½"×½") consisted of either brass or low carbon steel. Reactors were 15 mL Ace pressure tubes with a threaded PTFE plug. Array reactors were heated in a stationary lab oven.

Stock solutions were prepared as follows:

A.) 843 mg DTBMP was diluted to 10 ml with 2-bromo-3,3,3-trifluoropropene

TABLE 1

| Additives to 2-bromo-3,3,3-trifluoropropene | Coupon | Final pH | Coupon wt. (g) | Coupon Δ (mg) | Appearance | Residue (mg) |
|---|---|---|---|---|---|---|
| None | Steel | 4.39 | 1.8560 | Nil | NC | 8.3 |
| 100 ppm H$_2$O | Steel | 4.91 | 1.7952 | Nil | NC | 6.6 |
| 1000 ppm H$_2$O | Steel | 5.51 | 1.9073 | Nil | Slight discoloration | 9.3 |
| 1000 ppm CPO | Steel | 5.4 | 1.8959 | Nil | NC | 1.2 |
| 1000 ppm CPO + 100 ppm H$_2$O | Steel | 5.33 | 1.9289 | −0.3 | NC | 1.2 |
| 1000 ppm CHO | Steel | 5.61 | 1.8941 | −0.2 | NC | 2.1 |
| 1000 ppm CHO + 100 ppm H$_2$O | Steel | 5.7 | 1.8252 | Nil | NC | 1.4 |
| 1000 ppm PO | Steel | 5.38 | 1.8757 | Nil | NC | 2.1 |
| 1000 ppm PO + 100 ppm H$_2$O | Steel | 5.55 | 1.9256 | Nil | NC | 2.3 |
| None | Brass | 5.08 | 2.3965 | Nil | NC | 5.3 |
| 100 ppm H$_2$O | Brass | 5.22 | 2.1438 | Nil | NC | 5.3 |
| 1000 ppm H$_2$O | Brass | 5.57 | 2.2547 | Nil | NC | 9.1 |
| 1000 ppm CPO | Brass | 5.55 | 2.2169 | −0.3 | NC | 1.8 |
| 1000 ppm CPO + 100 ppm H$_2$O | Brass | 5.65 | 2.3083 | Nil | NC | 1.9 |
| 1000 ppm CHO | Brass | 5.92 | 2.4434 | Nil | NC | 1.9 |
| 1000 ppm CHO + 100 ppm H$_2$O | Brass | 5.95 | 2.2713 | Nil | NC | 1.8 |
| 1000 ppm PO | Brass | 5.67 | 2.2990 | Nil | NC | 2.7 |
| 1000 ppm PO + 100 ppm H$_2$O | Brass | 5.81 | 2.4298 | Nil | NC | 4.4 |

NC = No visible change

Nil: the measured weight difference was 0.0001 gram or less (the sensitivity limit of the balance used).

EXAMPLE 2

Method 1

Approximately 1 kg of 2-bromo-3,3,3-trifluoropropene was stored over anhydrous sodium carbonate at least overnight. The 2-bromo-3,3,3-trifluoropropene is decanted into a distillation flask containing ~60 g of pretreated (heated to 400° C. for 1 hour and cooled in a desiccator) basic alumina, and the 2-bromo-3,3,3-trifluoropropene is distilled under nitrogen at atmospheric pressure. A 3 mL aliquot is shaken with 5 mL of deionized water and the pH of the aqueous phase is measured.

Method 2

When 2-bromo-3,3,3-trifluoropropene has been stored after being pretreated according to Method 1 it may become acidic. If the pH is less than 7.0, the material is washed over pretreated alumina. Approximately 60 g of alumina is used for every 1 kg of 2-bromo-3,3,3-trifluoropropene. The 2-bromo-3,3,3-trifluoropropene is stirred over the alumina for at least 30 minutes then filtered through a fritted funnel. A B.) 847 mg AN-1216 was diluted to 10 ml with 2-bromo-3,3,3-trifluoropropene C.) 1.736 ml CHO was diluted to 10 ml with 2-bromo-3,3,3-trifluoropropene In an air atmosphere, 10 mL (16.7 g) of spec. 2-bromo-3,3,3-trifluoropropene (pretreated according to methods 1 and/or 2) was added into a 15 ml pre-weighed pressure tube (glass weight only). A pre-weighed brass or steel coupon was added followed by a necessary amount of stock solution, whichever was appropriate, to give the correct composition of agent(s). 1.7 µl of deionized water was added to each tube via microsyringe. The vials were placed in a heated oven at either 60° C. or 93° C. for 1, 2 or 4 weeks.

After this time, color changes and visible metal corrosion were noted, and a 3 mL aliquot of the composition was diluted with 5 mL of deionized water and mixed. The pH of the upper aqueous phase was measured. The coupon was removed, rinsed with acetone, dried, and weighed. The open pressure tubes were placed in a vented oven at 40° C. and allowed to sit overnight while the 2-bromo-3,3,3-trifluoropropene evaporated. The oven temperature was then raised to 100° C. for 1 hour under strong vacuum to remove any residual 2-bromo-3,3,3-trifluoropropene.

Once cooled the vials were weighed, the original tare weight was subtracted to obtain the residue weight. Residue controls were prepared and immediately evaporated.

EXAMPLE 3

The experiments above were repeated, with the exception that the samples were stored under air, yielded the results presented in Table 2 for the conditions given in Table 2. In order to determine how protective the stabilizer additives were to these contaminants, the presence of air and 100 ppm of additional water were used to simulate a typical level of contamination that would be expected to occur during material handling or servicing of fire extinguishers. The intial pH of an aliquot (3 mL) of the composition diluted with 5 mL of HPLC grade water, and measuring the pH of upper aqueous phase, was 8.01.

TABLE 2

| Additives to 2-bromo-3,3,3-trifluoropropene | Coupon | Temp. (° C.) | Testing time | Final pH | Coupon Δ (mg) | Appearance (1 week) | Residue (mg) |
|---|---|---|---|---|---|---|---|
| 100 ppm H$_2$O + 2000 ppm DTMP | Brass | 60 | 1 week | 3.92 | −0.5 | Coupon is dull and slightly copper colored. Hazy film on glass | 4.0 |
| 100 ppm H$_2$O + 2000 ppm Ethanox 4716 | Brass | 60 | 1 week | 3.69 | Nil | Coupon is dull, NC w/solution | 12.2 |

NC = No visible change
Nil: the measured weight difference was 0.0002 gram or less (2 × the sensitivity limit of the balance used).

EXAMPLE 4

The experiments above were repeated with all samples stored under atmospheric air yielded the results presented in Table 3. The initial pH of an aliquot (3 mL) of the composition diluted with 5 mL of HPLC grade water, and measuring the pH of upper aqueous phase, was 8.01.

TABLE 3

| Additives to 2-bromo-3,3,3-trifluoropropene | Coupon | Temp. (° C.) | Testing time | Final pH | Coupon Δ (mg) | Appearance (1 week) | Residue (mg) |
|---|---|---|---|---|---|---|---|
| 100 ppm H$_2$O + 2000 ppm CHO + 1000 ppm DTBMP | Brass | 60 | 2 weeks | 5.29 | −0.4 | Slightly yellow but clear liquid, | 15.7 |
| 100 ppm H$_2$O + 2000 ppm CHO + 1000 ppm DTBMP | Steel | 60 | 2 weeks | 5.17 | Nil | Slightly yellow but clear liquid, Coupon-NC | 13.0 |
| 100 ppm H$_2$O + 2000 ppm CHO + 1000 ppm DTBMP | Brass | 60 | 4 weeks | 5.00 | Nil | Slightly yellow but clear liquid, | 10.6 |
| 100 ppm H$_2$O + 2000 ppm CHO + 1000 ppm DTBMP | Steel | 60 | 4 weeks | 4.95 | Nil | Slightly yellow but clear liquid, Coupon-NC | 7.2 |
| 100 ppm H$_2$O + 2000 ppm CHO + 1000 ppm Ethanox 4716 | Brass | 60 | 2 weeks | 5.25 | Nil | Clear & colorless liquid | 18.5 |
| 100 ppm H$_2$O + 2000 ppm CHO + 1000 ppm Ethanox 4716 | Steel | 60 | 4 weeks | 5.31 | Nil | Clear & colorless liquid, Coupon-NC | 27.0 |
| 100 ppm H$_2$O + 2000 ppm CHO + 1000 ppm Ethanox 4716 | Brass | 60 | 4 weeks | 5.26 | Nil | Clear & colorless liquid | 10.7 |
| 100 ppm H$_2$O + 2000 ppm CHO + 1000 ppm Ethanox 4716 | Steel | 60 | 4 weeks | 5.09 | Nil | Slightly yellow but clear liquid, Coupon-NC | 21.7 |
| 100 ppm H$_2$O + 2000 ppm CHO + 1000 ppm Ethanox 4716 + 300 ppm DTBMP | Brass | 60 | 2 weeks | 5.42 | Nil | Slightly yellow but clear liquid$^a$ | 18.4 |
| 100 ppm H$_2$O + 2000 ppm CHO + 1000 ppm Ethanox 4716 + 300 ppm DTBMP | Steel | 60 | 2 weeks | 4.93 | Nil | Clear & colorless liquid, Coupon-NC | 23.8 |
| 100 ppm H$_2$O + 2000 ppm CHO + 1000 ppm Ethanox 4716 + 300 ppm DTBMP | Brass | 60 | 4 weeks | 5.11 | Nil | Slightly yellow but clear liquid$^a$ | 13.1 |
| 100 ppm H$_2$O + 2000 ppm CHO + 1000 ppm Ethanox 4716 + 300 ppm DTBMP | Steel | 60 | 4 weeks | 5.04 | Nil | Slightly yellow but clear liquid, Coupon-NC | 12.3 |

TABLE 3-continued

| Additives to 2-bromo-3,3,3-trifluoropropene | Coupon | Temp. (° C.) | Testing time | Final pH | Coupon Δ (mg) | Appearance (1 week) | Residue (mg) |
|---|---|---|---|---|---|---|---|
| 100 ppm $H_2O$ + 2000 ppm CHO | Brass | 60 | 2 weeks | 5.44 | Nil | Clear & colorless liquid[a] | 19.9 |
| 100 ppm $H_2O$ + 2000 ppm CHO | Steel | 60 | 2 weeks | 3.94 | −0.4 | Clear slightly brownish-rust colored liquid, Coupon-NC | 29.1 |
| 100 ppm $H_2O$ + 2000 ppm CHO | Brass | 60 | 4 weeks | 5.17 | Nil | Clear & colorless liquid[a] | 15.1 |
| 100 ppm $H_2O$ + 2000 ppm CHO | Steel | 60 | 4 weeks | 2.93 | −1.7 | Clear orange liquid, Coupon-NC | 31.8 |

[a] These brass coupons appeared only slightly yellow when under close inspection at only certain angles to the light. This yellow color was noticeable only when compared directly next to that of an untested brass coupon.
NC = No visible change
Nil: the measured weight difference was 0.0002 gram or less (2 × the sensitivity limit of the balance used).

EXAMPLE 5

The experiments above were repeated with all samples stored under atmospheric air yielded the results presented in Table 4 for the conditions given in Table 4. The initial pH of an aliquot (3 mL) of the composition diluted with 5 mL of HPLC grade water, and measuring the pH of upper aqueous phase, was 7.61.

TABLE 4

| Additives to 2-bromo-3,3,3-trifluoropropene | Coupon | Temp. (° C.) | Testing time | Final pH | Coupon Δ (mg) | Appearance (1 week) | Residue (mg) |
|---|---|---|---|---|---|---|---|
| 100 ppm $H_2O$ + 2000 ppm CHO + 1000 pm DTBMP | Brass | 93 | 2 weeks | 5.21 | Nil | Slightly yellow but clear liquid[a] | 4.5 |
| 100 ppm $H_2O$ + 2000 ppm CHO + 1000 pm DTBMP | Steel | 93 | 2 weeks | 4.68 | Nil | Slightly yellow but clear liquid, Coupon-NC | 20.4 |
| 100 ppm $H_2O$ + 2000 ppm CHO + 1000 pm DTBMP | Brass | 93 | 4 weeks | 5.03 | Nil | Slightly yellow but clear liquid, Copper colored coupon | 24.0 |
| 100 ppm $H_2O$ + 2000 ppm CHO + 1000 pm DTBMP | Steel | 93 | 4 weeks | 4.73 | Nil | Slightly yellow but clear liquid, Coupon-NC | 30.8 |
| 100 ppm $H_2O$ + 2000 ppm CHO + 1000 ppm Ethanox 4716 | Brass | 93 | 2 weeks | 4.82 | Nil | Liquid colorless but hazy[a] | 22.9 |
| 100 ppm $H_2O$ + 2000 ppm CHO + 1000 ppm Ethanox 4716 | Steel | 93 | 2 weeks | 4.96 | Nil | Slightly yellow but clear liquid, Coupon-NC | 24.6 |
| 100 ppm $H_2O$ + 2000 ppm CHO + 1000 ppm Ethanox 4716 | Brass | 93 | 4 weeks | 4.71 | Nil | Colorless liquid, coupon is slightly copper colored on corners | 24.0 |
| 100 ppm $H_2O$ + 2000 ppm CHO + 1000 ppm Ethanox 4716 | Steel | 93 | 4 weeks | 4.71 | Nil | Clear & colorless liquid, Coupon-NC | 39.6 |
| 100 ppm $H_2O$ + 2000 ppm CHO + 1000 ppm Ethanox 4716 + 300 ppm DTBMP | Brass | 93 | 2 weeks | 4.66 | Nil | Slightly yellow but clear liquid,[a] | 21.7 |
| 100 ppm $H_2O$ + 2000 ppm CHO + 1000 ppm Ethanox 4716 + 300 ppm DTBMP | Steel | 93 | 2 weeks | 5.04 | Nil | Slightly yellow but clear liquid, Coupon-NC | 19.2 |
| 100 ppm $H_2O$ + 2000 ppm CHO + 1000 ppm Ethanox 4716 + 300 ppm DTBMP | Brass | 93 | 4 weeks | 5.02 | Nil | Slightly yellow but clear liquid[a] | 22.2 |
| 100 ppm $H_2O$ + 2000 ppm CHO + 1000 ppm Ethanox 4716 + 300 ppm DTBMP | Steel | 93 | 4 weeks | 4.78 | Nil | Slightly yellow but clear liquid, Coupon-NC | 29.6 |
| 100 ppm $H_2O$ + 2000 ppm CHO | Brass | 93 | 2 weeks | 4.68 | Nil | Clear & colorless liquid[a] | 19.1 |
| 100 ppm $H_2O$ + 2000 ppm CHO | Steel | 93 | 2 weeks | 4.71 | Nil | Nil Clear & colorless liquid, Coupon-NC | 22.6 |

TABLE 4-continued

| Additives to 2-bromo-3,3,3-trifluoropropene | Coupon | Temp. (° C.) | Testing time | Final pH | Coupon Δ (mg) | Appearance (1 week) | Residue (mg) |
|---|---|---|---|---|---|---|---|
| 100 ppm $H_2O$ + 2000 ppm CHO | Brass | 93 | 4 weeks | 5.33 | Nil | Clear & colorless liquid, [a] | 30.0 |
| 100 ppm $H_2O$ + 2000 ppm CHO | Steel | 93 | 4 weeks | 4.98 | Nil | Clear & colorless liquid, Coupon-NC | 32.6 |

[a] These brass coupons appeared only slightly yellow when under close inspection at only certain angles to the light. This yellow color was noticeable only when compared directly to the golden color of an untested brass coupon.
NC = No visible change
Nil: the measured weight difference was 0.0002 gram or less (2 × the sensitivity limit of the balance used).

Residue Controls:

The residue controls yielded the results depicted in Table 4. The initial pH of an aliquot (3 mL) of the composition diluted with 5 mL of HPLC grade water, and measuring the pH of upper aqueous phase, was 7.80.

| Additives to 2-bromo-3,3,3-trifluoropropene | Measured Residue (mg) | Theoretical Residue (mg) |
|---|---|---|
| 2000 ppm CHO + 1000 pm DTBMP | 7.0 | 11.69 |
| 2000 ppm CHO + 1000 ppm AN-1216 | 12.2 | 11.69 |
| 2000 ppm CHO + 1000 ppm AN-1216 + 300 ppm DTBMP | 13.1 | 15.2 |
| 2000 ppm CHO | 9.8 | 0.0 |

B: The assumption was made that all the cyclohexene oxide and water were evaporated and the theoretical mass of residue is base solely upon the amount of antioxidant added.

EXAMPLE 6

Compositions were tested for stability as described above for Example 2 with the following exceptions. Triethyl phosphite 98% [122-52-1] (TEP).

Stock solutions were prepared as follows:
A.) 1.736 ml CHO diluted to 10 ml with 2-bromo-3,3,3-trifluoropropene
B.) 441 mg DTBMP diluted to 10 ml with 2-bromo-3,3,3-trifluoropropene
C.) 441 mg Ethanx 4716 diluted to 10 ml with 2-bromo-3,3,3-trifluoropropene
D.) 462 µl TEP diluted to 10 ml with 2-bromo-3,3,3-trifluoropropene The reaction vials were placed in a heated oven at 60° C. for 1 week. The initial pH of an aliquot (3 mL) of the composition diluted with 5 mL of HPLC grade water, and measuring the pH of upper aqueous phase, was 8.50. The results are presented in Table 5.

TABLE 5

| Additives to 2-bromo-3,3,3-trifluoropropene | Coupon | Temp. (° C.) | Testing time | Final pH | Coupon Δ (mg) | Appearance (1 week) | Residue (mg) |
|---|---|---|---|---|---|---|---|
| 100 ppm $H_2O$ + 2000 ppm CHO + 1000 ppm DTBMP + 100 ppm TEP | Brass | 60 | 1 week | 5.50 | Nil | Clear & colorless liquid, dull copper colored coupon | 13.5 |
| 100 ppm $H_2O$ + 2000 ppm CHO + 1000 ppm DTBMP + 100 ppm TEP | Steel | 60 | 1 week | 4.35 | Nil | Clear & colorless liquid, Coupon-NC | 15.6 |
| 100 ppm $H_2O$ + 2000 ppm CHO + 1000 ppm Ethanox 4716 + 100 ppm TEP | Brass | 60 | 1 week | 5.53 | Nil | Clear & colorless liquid, dull copper colored coupon | 17.7 |
| 100 ppm $H_2O$ + 2000 ppm CHO + 1000 ppm Ethanox 4716 + 100 ppm TEP | Steel | 60 | 1 week | 4.56 | Nil | Clear & colorless liquid, Coupon-NC | 14.3 |
| 100 ppm $H_2O$ + 900 ppm CHO + 1000 ppm DTBMP | Brass | 60 | 1 week | 5.21 | Nil | Slightly yellow but clear liquid, Coupon-NC | 12.1 |
| 100 ppm $H_2O$ + 900 ppm CHO + 1000 ppm DTBMP | Steel | 60 | 1 week | 4.16 | Nil | Slightly yellow but clear liquid, Coupon-NC | 15.5 |
| 100 ppm $H_2O$ + 900 ppm CHO + 1000 ppm Ethanox 4716 | Brass | 60 | 1 week | 4.28 | Nil | Cloudy, colorless liquid, etched glass | 17.3 |
| 100 ppm $H_2O$ + 900 ppm CHO + 1000 ppm Ethanox 4716 | Steel | 60 | 1 week | 4.95 | Nil | Clear & colorless liquid, Coupon-NC | 19.2 |

NC = No visible change
Nil: the measured weight difference was 0.0002 gram or less (2 × the sensitivity limit of the balance used).

EXAMPLE 7

Compositions were tested for stability as described above for Example 2 with the following exceptions. Di-n-butylsulfoxide 96% [2168-93-6] (DBS)
1,2,5,6-Diepoxycyclooctane 96% [27035-39-8] (DECO)
Stock solutions were prepared as follows:
A.) 1.736 ml CHO diluted to 10 ml with 2-bromo-3,3,3-trifluoropropene
B.) 441 mg DTBMP diluted to 10 ml with 2-bromo-3,3,3-trifluoropropene
C.) 441 mg Ethanox 4716 diluted to 10 ml with 2-bromo-3,3,3-trifluoropropene
D.) DBS diluted to 10 ml with 2-bromo-3,3,3-trifluoropropene All samples contained both a brass and a carbon steel coupon touching while submerged in the composition. The initial pH of an aliquot (3 mL) of the composition diluted with 5 mL of HPLC grade water, and measuring the pH of upper aqueous phase, was 8.70. The results are presented in Table 6.

TABLE 6

| Additives to 2-bromo-3,3,3-trifluoropropene | Coupon | Temp. (° C.) | Testing time | Final pH | Coupon $\Delta$ (mg) | Appearance (1 week) | Residue (mg) |
|---|---|---|---|---|---|---|---|
| 100 ppm $H_2O$ + 2000 ppm CHO + 1000 ppm Ethanox 4716 + 100 ppm DBS | Brass + Steel | 60 | 1 week | 6.83 | NC | NC | 0.2 |
| 100 ppm $H_2O$ + 2000 ppm CHO + 1000 ppm Ethanox 4716 + 100 ppm DBS | Brass + Steel | 60 | 2 weeks | 5.69 | NC | Dullness on brass coupon - side touching other coupon | 4.7 |
| 100 ppm $H_2O$ + 2000 ppm CHO + 1000 ppm Ethanox 4716 + 100 ppm DECO | Brass + Steel | 60 | 1 week | 5.46 | NC | NC | 11.4 |
| 100 ppm $H_2O$ + 2000 ppm CHO + 1000 ppm Ethanox 4716 + 100 ppm DECO | Brass + Steel | 60 | 2 weeks | 4.35 | NC | NC | 15.5 |
| 100 ppm $H_2O$ + 2000 ppm CHO + 1000 ppm Ethanox 4716 + 100 ppm DBS + 100 ppm DECO | Brass + Steel | 60 | 1 week | 4.93 | NC | NC | 10.3 |
| 100 ppm $H_2O$ + 2000 ppm CHO + 1000 ppm Ethanox 4716 + 100 ppm DBS + 100 ppm DECO | Brass + Steel | 60 | 2 weeks | 4.49 | NC | Dullness on brass coupon - side touching other coupon | 11.7 |
| 100 ppm $H_2O$ + 2000 ppm CHO + 1000 ppm DTBMP + 100 ppm DBS | Brass + Steel | 60 | 1 week | 6.02 | NC | NC | 4.4 |
| 100 ppm $H_2O$ + 2000 ppm CHO + 1000 ppm DTBMP + 100 ppm DBS | Brass + Steel | 60 | 2 weeks | 5.35 | NC | NC | 1.2 |
| 100 ppm $H_2O$ + 2000 ppm CHO + 1000 ppm DTBMP + 100 ppm DECO | Brass + Steel | 60 | 1 week | 4.54 | NC | NC | 7.1 |
| 100 ppm $H_2O$ + 2000 ppm CHO + 1000 ppm DTBMP + 100 ppm DECO | Brass + Steel | 60 | 2 weeks | 4.70 | NC | NC | 5.6 |
| 100 ppm $H_2O$ + 2000 ppm CHO + 1000 ppm DTBMP + 100 ppm DBS + 100 ppm DECO | Brass + Steel | 60 | 1 week | 5.39 | NC | NC | 7.3 |
| 100 ppm $H_2O$ + 2000 ppm CHO + 1000 ppm DTBMP + 100 ppm DBS + 100 ppm DECO | Brass + Steel | 60 | 2 weeks | 5.44 | NC | NC | 0 |
| 100 ppm $H_2O$ + 2000 ppm CHO + 100 ppm DBS | Brass + Steel | 60 | 1 week | 5.37 | NC | NC | 3.1 |
| 100 ppm $H_2O$ + 2000 ppm CHO + 100 ppm DBS | Brass + Steel | 60 | 2 weeks | 5.21 | NC | NC | 0.6 |
| 100 ppm $H_2O$ + 2000 ppm CHO + 100 ppm DECO | Brass + Steel | 60 | 1 week | 5.29 | NC | NC | 7.4 |
| 100 ppm $H_2O$ + 2000 ppm CHO + | Brass + Steel | 60 | 2 weeks | 5.05 | NC | NC | 29.2 |

TABLE 6-continued

| Additives to 2-bromo-3,3,3-trifluoropropene | Coupon | Temp. (° C.) | Testing time | Final pH | Coupon Δ. (mg) | Appearance (1 week) | Residue (mg) |
|---|---|---|---|---|---|---|---|
| 100 ppm DECO 100 ppm H$_2$O + 2000 ppm CHO + 100 ppm DBS + 100 ppm DECO | Brass + Steel | 60 | 1 week | 5.91 | NC | NC | −2.0 |
| 100 ppm H$_2$O + 2000 ppm CHO + 100 ppm DBS + 100 ppm DECO | Brass + Steel | 60 | 2 weeks | 5.21 | NC | Dullness on brass coupon - side touching other coupon | 1.8 |

NC = No visible change
Nil: the measured weight difference was 0.0002 gram or less (2 × the sensitivity limit of the balance used).

Although the claims have been described in the context of certain preferred embodiments and examples, it will be understood by those skilled in the art that the present claims extends beyond the specifically disclosed embodiments to other alternative embodiments and/or uses and obvious modifications and equivalents thereof. Thus, it is intended that the scope of the claims disclosed should not be limited by the particular disclosed embodiments described above.

What is claimed is:

1. A stabilized composition comprising:
   2-bromo-3,3,3-trifluoropropene;
   cyclohexene oxide or cyclopentene oxide; and
   at least one antioxidant selected from the group consisting of: 2,5-di-tert-butyl-4-methoxyphenol; a C$_{7-9}$ branched alkyl ester of 3,5,-di-tert-butyl-4-hydroxycinnamic acid; and 1,2,5,6-diepoxycyclooctane.

2. The composition of claim 1 consisting essentially of:
   2-bromo-3,3,3-trifluoropropene;
   cyclohexene oxide; and
   2,5-di-tert-butyl-4-methoxyphenol; a C$_{7-9}$ branched alkyl ester of 3,5,-di-tert-butyl-4-hydroxycinnamic acid; or 1,2,5,6-diepoxycyclooctane.

3. The composition of claim 1, wherein the cyclohexene oxide or cyclopentene oxide has a concentration in the range of about 500 ppm to about 10,000 ppm, based upon the weight of the stabilized composition.

4. The composition of claim 1, comprising a C$_{7-9}$ branched alkyl ester of 3,5,-di-tert-butyl-4-hydroxycinnamic acid having a concentration in the range of about 200 ppm to about 5000 ppm, based upon the weight of the stabilized composition.

5. The composition of claim 1, wherein the composition is stored in a container comprising a metal surface, wherein at least a portion of the metal surface is in contact with at least a portion of the composition.

6. The composition of claim 5, wherein the metal surface comprises at least one of steel and brass.

7. The composition of claim 1, further comprising N$_2$.

8. The composition of claim 7, wherein the N$_2$ has a partial pressure of about 20 psig to about 800 psig.

9. A fire extinguishing unit, comprising a container, a valve, a nozzle, and optionally a hose;
   wherein said container contains a fire extinguishing composition according to claim 1:
   wherein the composition has a pressure of about 70 psig to about 800 psig.

10. The fire extinguishing system of claim 9, wherein the container, valve and other wetted parts comprise at least one of steel, stainless steel, carbon steel, aluminum or brass.

11. A method of stabilizing 2-bromo-3,3,3-trifluoropropene comprising adding to the 2-bromo-3,3,3-trifluoropropene an effective amount of:
    cyclohexene oxide or cyclopentene oxide; and
    at least one antioxidant selected from the group consisting of 2,5-di-tert-butyl-4-methoxyphenol; a C$_{7-9}$ branched alkyl ester of 3,5,-di-tert-butyl-4-hydroxycinnamic acid; and 1,2,5,6-diepoxycyclooctane.

12. The method of claim 11, comprising adding about 2000 ppm by weight cyclohexane oxide and about 1000 ppm by weight of a C$_{7-9}$ branched alkyl ester of 3,5,-di-tert-butyl-4-hydroxycinnamic acid to the 2-bromo-3,3,3-trifluoropropene.

13. The method of claim 11, comprising adding about 2000 ppm by weight cyclohexene oxide and about 1000 ppm by weight of 2,5-di-tert-butyl-4-methoxyphenol to the 2-bromo-3,3,3-trifluoropropene.

14. The method of claim 11, wherein adding cyclohexene oxide or cyclopentene oxide; and 2,5-di-tert-butyl-4-methoxyphenol; a C$_{7-9}$ branched alkyl ester of 3,5,-di-tert-butyl-4-hydroxycinnamic acid; or 1,2,5,6-diepoxycyclooctane to the 2-bromo-3,3,3-trifluoropropene provides a composition that is stable in the presence of a metal comprising carbon steel or brass such that substantially no visible change to the metal occurs upon contact between the composition and the metal for about 2 weeks at about 60° C.

15. The method of claim 11 where the purity of the 2-bromo-3,3,3-trifluoropropene is 99.0% or greater.

* * * * *